(12) United States Patent
Asada

(10) Patent No.: US 7,013,260 B2
(45) Date of Patent: Mar. 14, 2006

(54) DISPLAY DEVICE AND SAMPLE ANALYSIS DEVICE EQUIPPED WITH THE DISPLAY DEVICE

(75) Inventor: Shoichiro Asada, Akashi (JP)

(73) Assignee: Sysmex Corporation, Hyogo (JP)

( * ) Notice: Subject to any disclaimer, the term of this patent is extended or adjusted under 35 U.S.C. 154(b) by 698 days.

(21) Appl. No.: 10/059,455

(22) Filed: Jan. 29, 2002

(65) Prior Publication Data

US 2002/0103642 A1    Aug. 1, 2002

(30) Foreign Application Priority Data

Jan. 30, 2001   (JP) .............................. 2001-021746

(51) Int. Cl.
*G10L 15/00*    (2006.01)

(52) U.S. Cl. ............................ 704/8; 704/270; 345/700

(58) Field of Classification Search .................... 704/8, 704/270; 345/700, 708
See application file for complete search history.

(56) References Cited

U.S. PATENT DOCUMENTS

| 5,757,476 | A | 5/1998 | Nakamoto et al. |
| 5,828,992 | A | 10/1998 | Kusmierczyk |
| 6,240,170 | B1 * | 5/2001 | Shaffer et al. ......... 379/142.15 |
| 6,243,675 | B1 * | 6/2001 | Ito ............................. 704/232 |
| 6,559,861 | B1 * | 5/2003 | Kennelly et al. ........... 715/703 |

* cited by examiner

*Primary Examiner*—Daniel Abebe
(74) *Attorney, Agent, or Firm*—Brinks Hofer Gilson & Lione

(57) ABSTRACT

A display device including an operator information storer for relating operator information and information concerning the type of language which the operator uses. The display device include a two or more character storers, including at least a first display character storer in which characters are described in a first language, a second display character storer in which characters are described in a second language, an input device for accepting the input of said operator information, a display character selector for accessing information concerning the type of language corresponding to the operator information accepted by the input device from the operator information storer, and for selecting the display character storer to be used, and a display panel for displaying the characters.

28 Claims, 16 Drawing Sheets

| Operator information DB | | |
|---|---|---|
| Login name | password | Language to be used |
| JAPANESE | JAPANESE | Japanese |
| ENGLISH | ENGLISH | English |
| FRENCH | FRENCH | French |
| GERMANY | GERMANY | German |
| CHINESE | CHINESE | Chinese |
| RUSSIAN | RUSSIAN | Russian |

FIG.3

| Operator information DB | | |
|---|---|---|
| Login name | password | Language to be used |
| A | a | Japanese |
| B | b | English |
| C | c | French |
| D | d | German |
| E | e | Chinese |
| F | f | Russian |

FIG.4

| Operator information DB | | |
|---|---|---|
| Login name | password | Language to be used |
| JAPANESE | JAPANESE | Japanese |
| ENGLISH | ENGLISH | English |
| FRENCH | FRENCH | French |
| GERMANY | GERMANY | German |
| CHINESE | CHINESE | Chinese |
| RUSSIAN | RUSSIAN | Russian |

FIG.8

| Sysmex | Ready | Manual Mode    Next No.1234567890123 | Sampler |
|  | DP:1234567890123 | HC GP DP SU |  |

< Sample Information >

| Sample No. | 12345678910-12 | | | | |
| Sex | Male | Female | | Collection Time | 11:01 |
| Source | OP.CLCT | MORNING | TIMED | AF.MEAL | CATH |
| Color | None | LyBrown | Yellow | YBrown | Orange |
|  | Red | DBrown | Green | Blue | White |
| Clarity | Clear | SlHazy | Hazy | SlCldy | Cloudy |

Cancel    OK

| Display character selection DB | |
|---|---|
| Language to be used | Used display character DB |
| Japanese | display character (Japanese) DB21 |
| English | display character (English) DB22 |
| French | display character (French) DB25 |
| German | display character (German) DB26 |
| Chinese | display character (Chinese) DB27 |
| Russian | display character (Russian) DB28 |

DISPLAY DEVICE AND SAMPLE ANALYSIS DEVICE EQUIPPED WITH THE DISPLAY DEVICE

CROSS-REFERENCE TO RELATED APPLICATION

This application claims benefit of priority under 35 U.S.C. § 119 to Japanese Patent Application No. 2001-21746, filed on Jan. 30, 2001, the disclosure of which is incorporated by reference in its entirety.

BACKGROUND

1. Field of the Invention

This invention relates to a display device which allows display of a plurality of languages, more particularly to a sample analysis device which is equipped with the display device.

2. Description of the Related Art

Generally, sample analysis devices such as a blood analysis device, a urinary analysis device or an industrial particle analysis device etc., are equipped with a display for displaying messages required for operation or for displaying analysis results, etc. The operator can perform various operations according to the messages displayed on this display, and obtain analysis results. Therefore, languages displayed on this display must be understood by the operator.

In recent years, labor markets have become less nationalized, and the use of a common analysis device by operators whose nationalities are different from each has become more frequent. Taking a blood analysis device as an example, there is an increased likelihood that multinational medical teams are dispatched to disaster areas to engage in medical treatment. As a result of the same analysis devices being more frequently used by operators whose nationalities are different from each other, there has been a growing demand for an analysis device that allows display of a plurality of languages.

While some conventional analysis devices are equipped with functions displayed in a plurality of languages, the languages displayed are generally set by the maker of the analysis device prior to the shipping of the devices and, for the most part, these pre-stored languages cannot be changed by the operators.

Further, more recently, there exist some devices such as operation panels of machines, printers, etc., in which an instruction for a language changeover (for example, a language changeover button) is displayed, and the operator changes the languages by operating the panel according to the display (for example, see U.S. Pat. No. 5,828,992).

When displaying the instruction for language changeover, the instruction may be displayed in any of a number of languages. However, because some operators cannot understand the displayed language, there may be some instances where the instruction is not understood to be for a language changeover.

SUMMARY

The present invention has been achieved under consideration of the above-mentioned problems. The invention provides a display device which automatically displays a language that an operator demands without the operator's instruction for language changeover. The invention also provides a sample analysis device equipped with this display device.

One aspect of this invention provides a display device equipped with an operator information storer for organizing and storing operator information and information concerning the type of language the operator uses, a first display character storer in which characters are described in a first language, a second display character storer in which characters are described in a second language, an input device for accepting input of the operator information, a display character selector for selecting which of the displayed character storers will be used to access information from the operator information storer, and which uses information concerning the type of language corresponding to said operator information which the input device accepted, and a display for displaying the characters.

The operator information may be a login name or password, or both a login name and password.

The login name or password may be a word expressing a type of language or country name.

The operator information may be accessed from a barcode or an IC chip.

The languages may be, for example, any of Japanese, English, French, German, Chinese, Russian, Spanish, and/or other languages.

The above display device may be further equipped with a printing screen producer adapted to convert the character to a format for printing.

The above display device may be used in a sample analysis device.

The above sample analysis device may display a combination of the characters of a language and measurement results obtained by analyzing the sample.

The sample which the above sample analysis device analyzes may be blood or urine.

Further, another aspect of the invention provides a sample analysis device equipped with an operator information, storer for storing operator information and information concerning the type of language the operator uses and/or resident country of the operator by relating each piece of information, a first display unit storer for describing the measurement result in the first unit, a second display unit storer for describing the measurement result in the second unit, an input device for accepting the input of the operator information, a display unit selector for selecting which display unit storer accesses information from the operator information storer, and the display unit selector using information concerning the type of language or resident country corresponding to the operator information which the input device accepted, an analyzer for analyzing a sample and obtaining the analysis information, a measurement result calculator for calculating the measurement result from the analysis information which the analyzer obtained, a display screen producer for producing a display screen in combination with said measurement result and information from said selected unit storer, and a display for displaying the display screen.

BRIEF DESCRIPTION OF THE DRAWINGS

FIG. 3 is an explanatory diagram showing information stored in the sample analysis device of FIG. 1.

FIG. 4 is an explanatory diagram showing information stored in the sample analysis device of FIG. 1.

FIG. 8 is a plan view of a specimen information accepting screen (English) displayed by the sample analysis device of FIG. 1.

Figure 11:
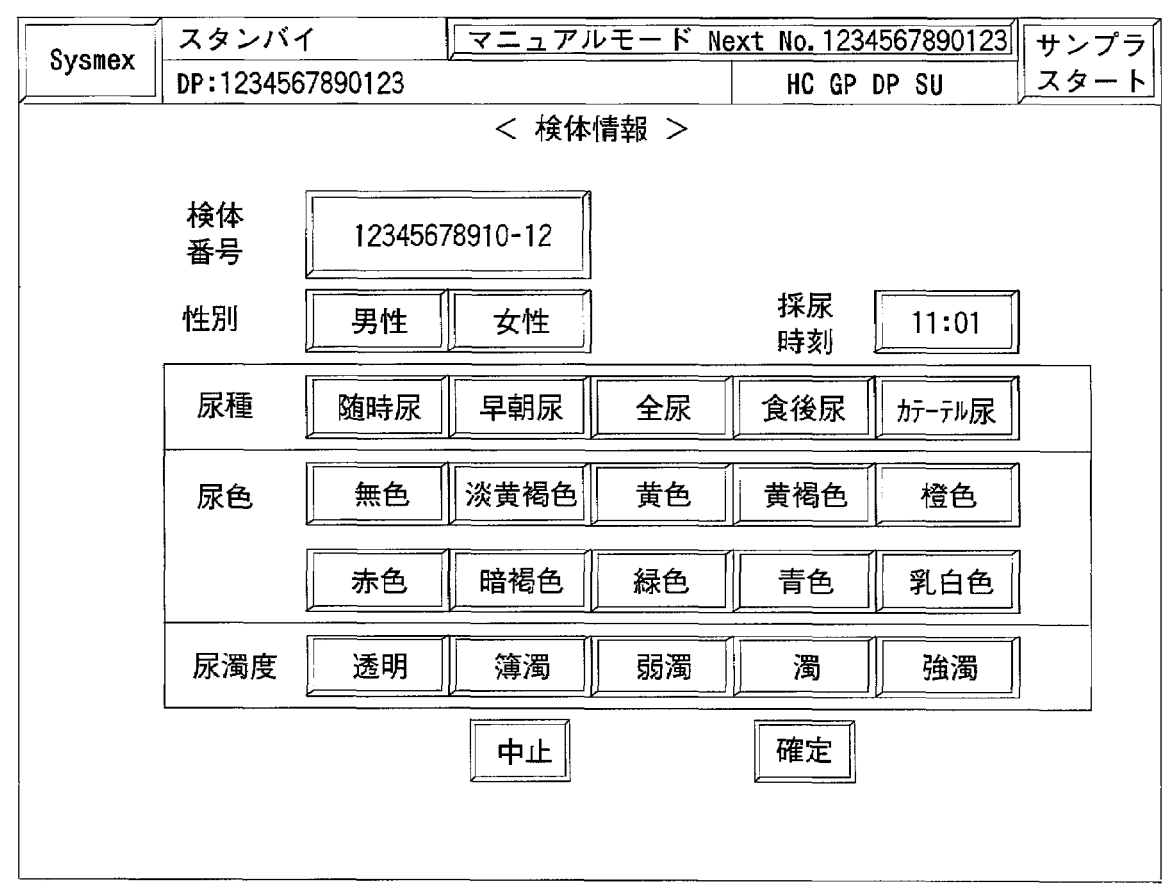

FIG. 11 is a plan view of a specimen information accepting screen (Japanese) displayed by the sample analysis device of FIG. 1.

FIG. 13 is an explanatory diagram showing information stored in the sample analysis device of FIG. 1.

DESCRIPTION OF THE PREFERRED EMBODIMENTS

Figure 1:
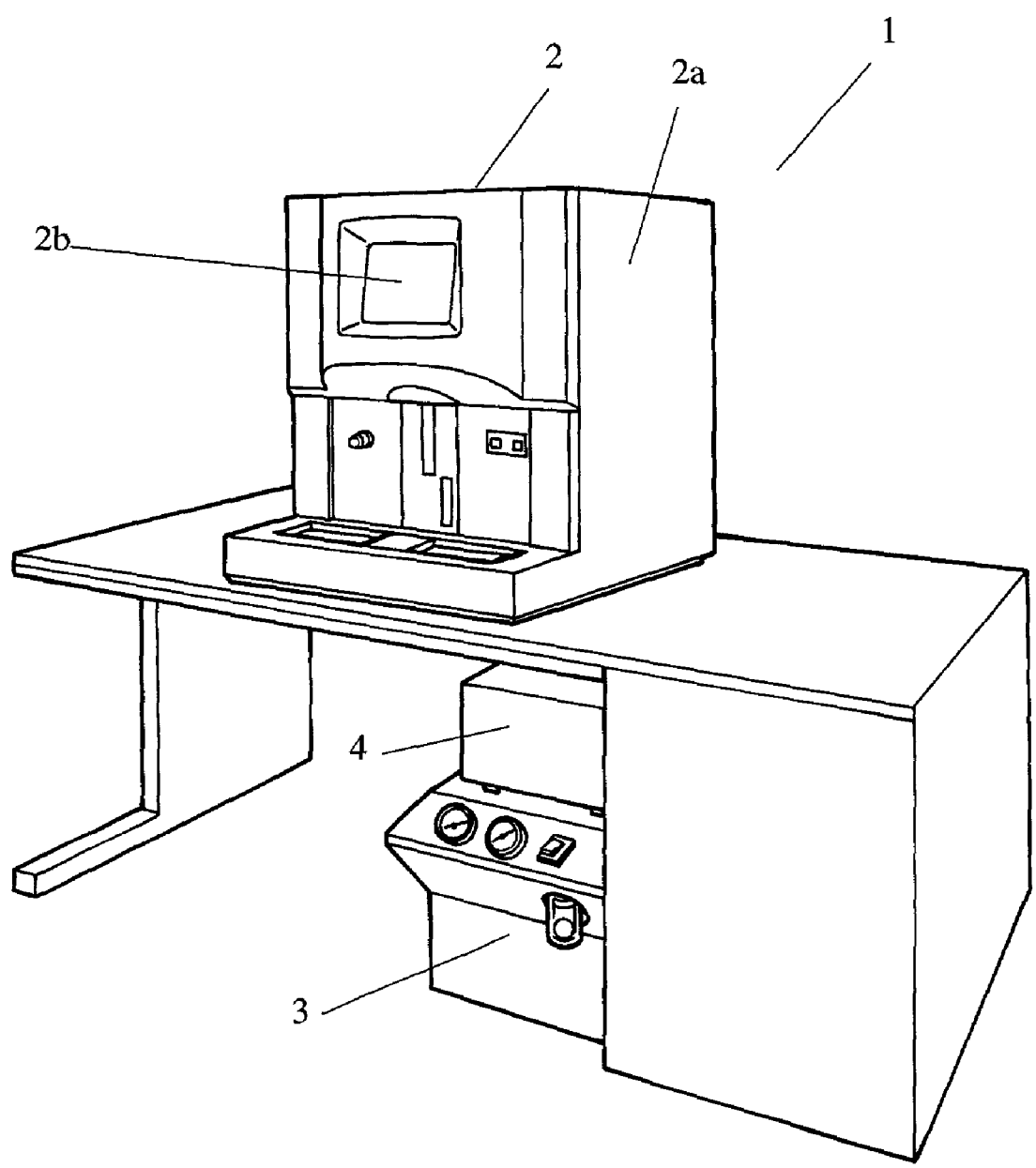
FIG. 1 is an overall perspective view of a sample analysis device equipped with a display device according to one aspect of the present invention.

Hereinafter, this invention will be described in detail according to the embodiments shown in the drawings. However, this invention is not limited by the embodiments, rather it is limited only by the claims that follow this Description.

FIG. 1 is an overall perspective view of a sample analysis system 1 according to one embodiment of the invention. This system comprises a sample analysis device 2, a vacuum or suction source 3, and a laser power supply 4. The sample analysis device 2 includes a sample analysis portion 2a consisting of a urinary analysis device (for example, a UF-100 analyzer made by SYSMEX CORPORATION, of Kobe Japan), and a display 2b having an LCD touch screen (the details of which will be described below). In the embodiment shown, the sample analysis portion 2a and display 2b are integrated. Alternately, the sample analysis portion 2a and display 2b may be separately constituted, and connected with a communications cable such as RC232C. In this case, a personal computer is preferably used for the display 2b.

Figure 2:
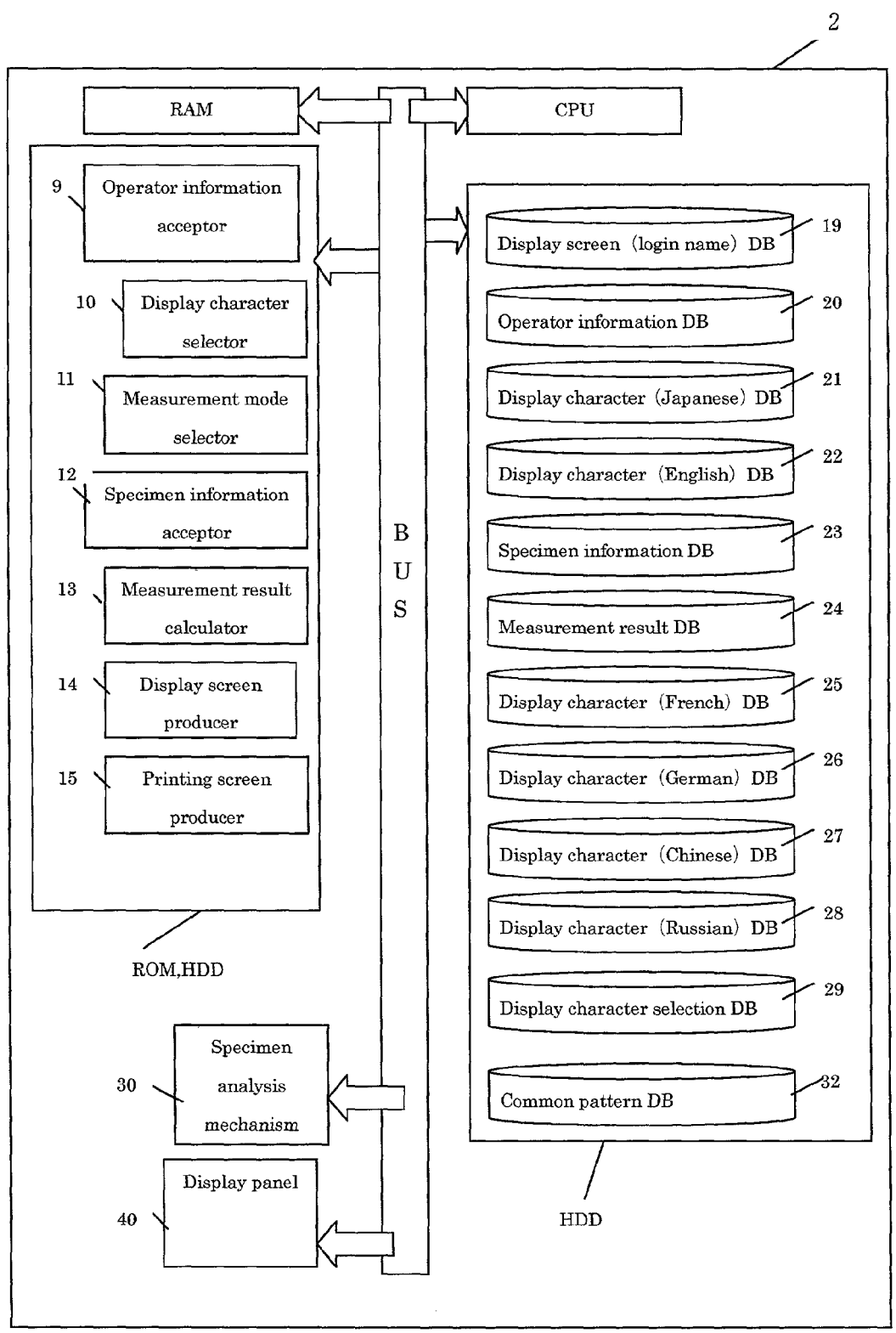
FIG. 2 is a block diagram showing an internal configuration of the sample analysis device of FIG. 1.

FIG. 2 is a block diagram showing an internal configuration of the sample analysis device 2 of this invention.

The sample analysis device 2 has an operator information acceptor 9, a display character selector 10, a measurement mode selector 11, a specimen information acceptor 12, a measurement result calculator 13, a display screen producer 14, a printing screen producer 15, a display screen (login name) database (hereinafter, "database" is abbreviated as "DB") 19, an operator information DB 20, a display character (Japanese) DB 21, a display character (English) DB 22, a specimen information DB 23, a measurement result DB 24, a display character (French) DB 25, a display character (German) DB 26, a display character (Chinese) DB 27, a display character (Russian) DB 28, a display character selection DB 29, and a common pattern DB 32. These parts consist of a CPU, ROM, RAM and hard disc etc., which are interconnected with a BUS. The sample analysis device 2 further comprises a specimen analysis mechanism 30 and a display panel 40. The specimen analysis mechanism 30 may include, for example, a pipette for suctioning specimens (not shown), a reagent supplying part (not shown) for supplying reagents such as a dilute solution and dyeing liquid to the specimen, and a flow cytometer (not shown) for obtaining analysis information, such as the amount of fluorescent and scattered light from the specimen, and providing the analysis information to the measurement result calculator 13. The display panel 40 includes a touch panel LCD, such as those commonly used as an input device for accepting information from the operator. Next, the content of the respective DBs in the specimen analysis device 2 will be described.

Figure 6:
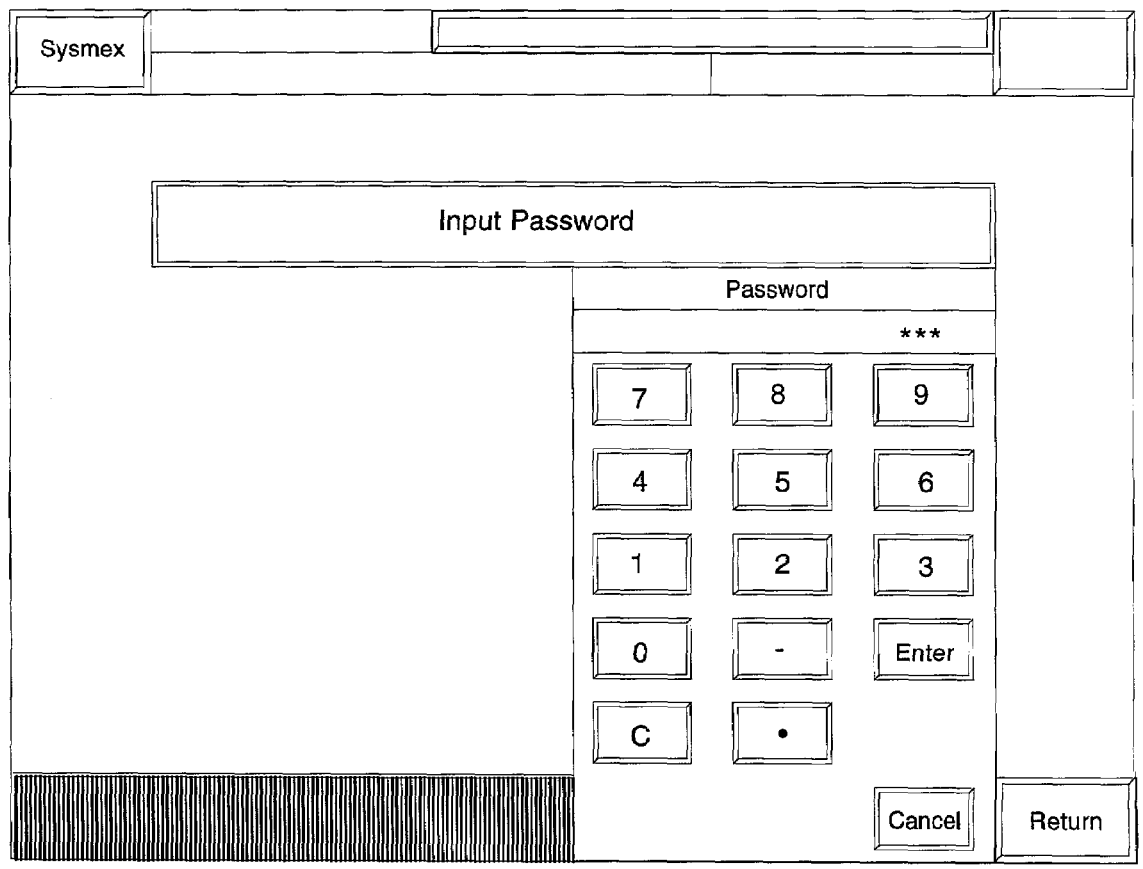
FIG. 6 is a plan view of a password accepting screen displayed by the sample analysis device of FIG. 1.
Figure 7:
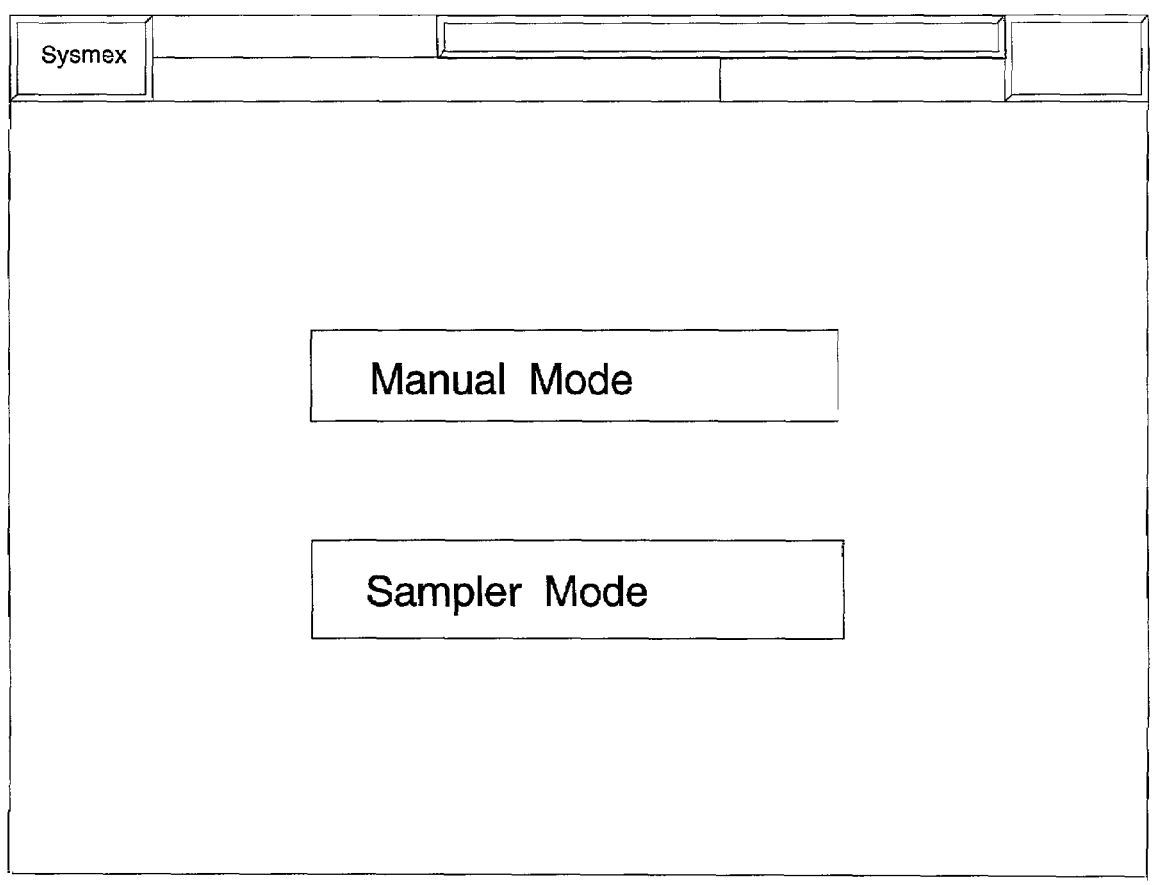
FIG. 7 is a plan view of a measurement mode accepting screen (English) displayed by sample analysis device of FIG. 1.
Figure 9:
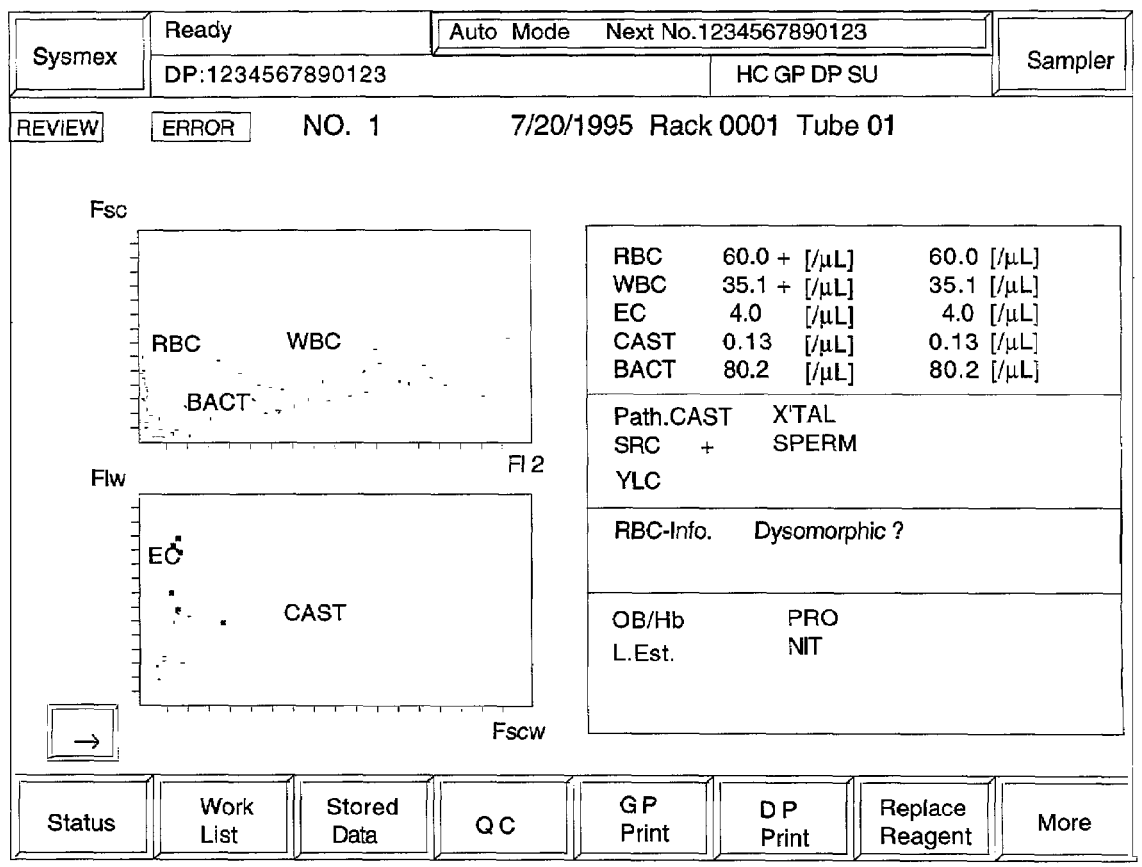
FIG. 9 is a plan view of a measurement result screen (English) displayed by the sample analysis device of FIG. 1.
Figure 10:
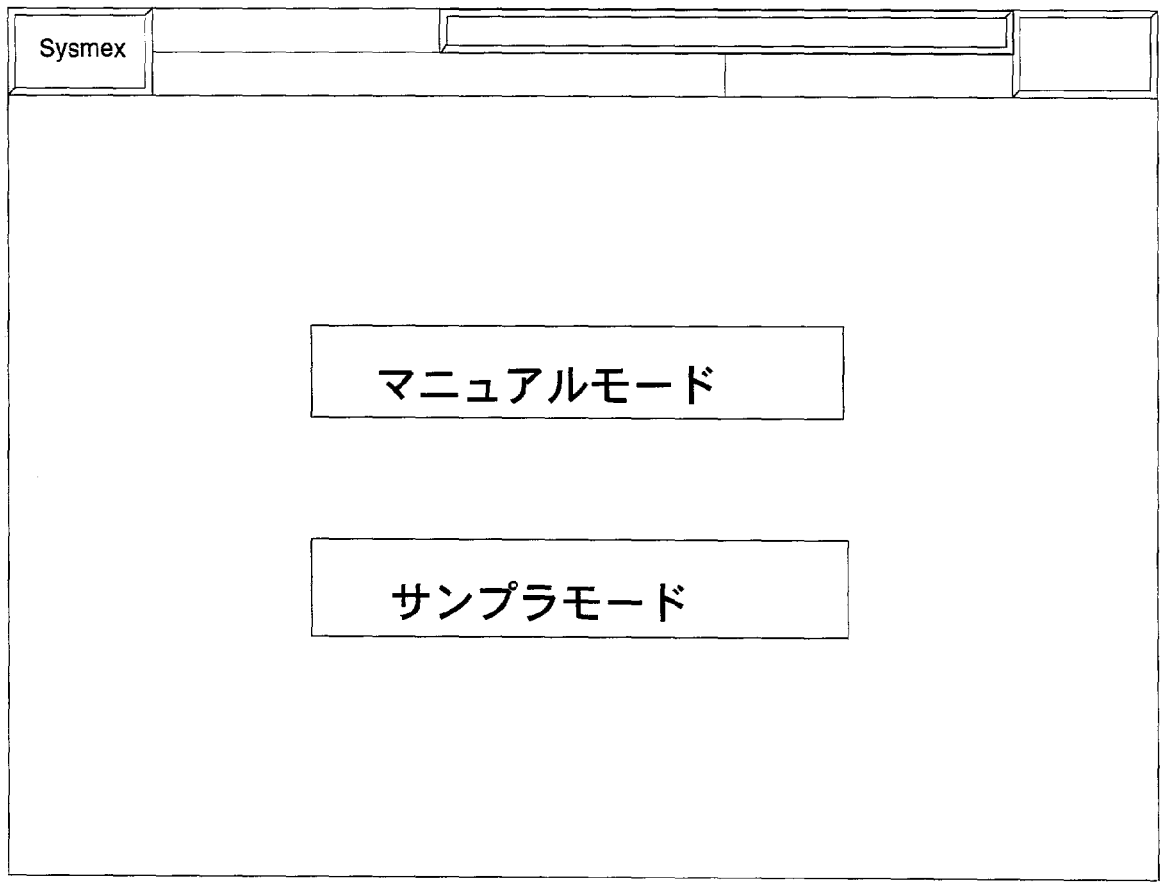
FIG. 10 is a plan view of a measurement mode accepting screen (Japanese) displayed by the sample analysis device of FIG. 1.
Figure 12:
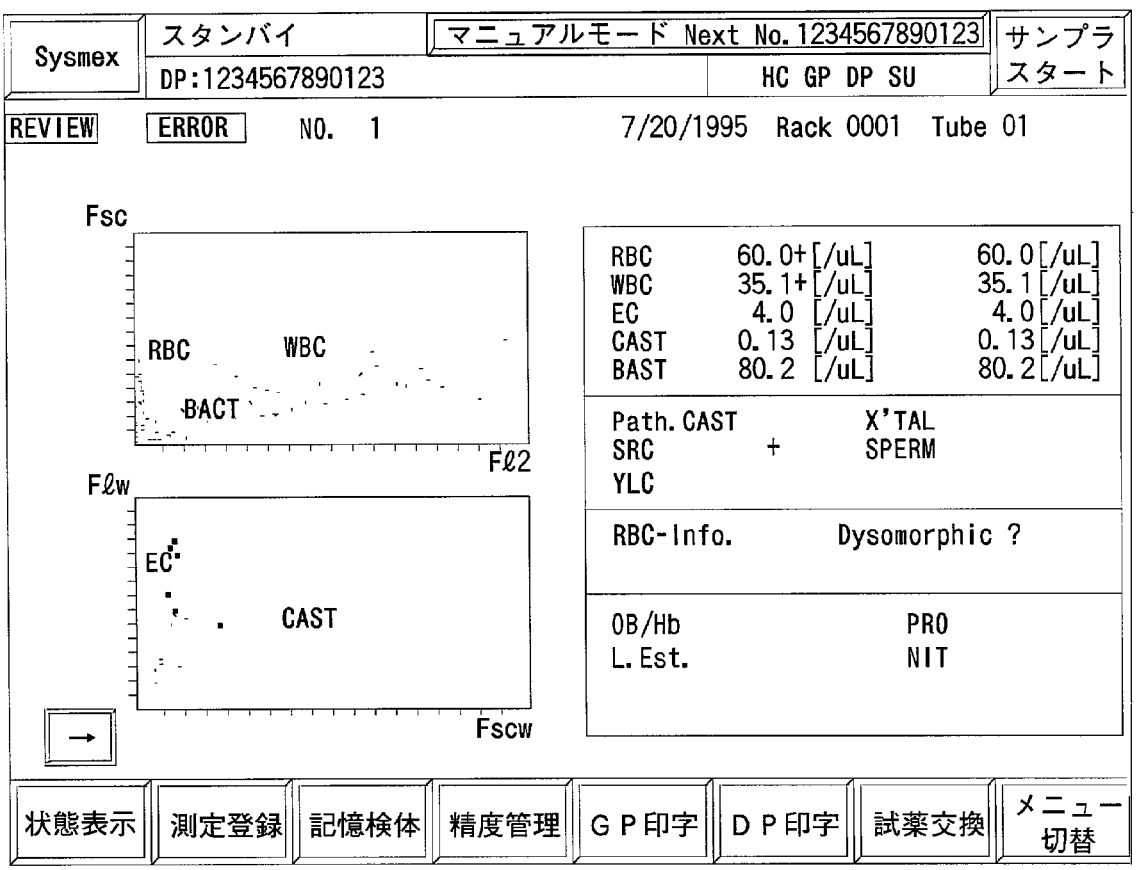
FIG. 12 is a plan view of a measurement result screen (Japanese) displayed by the sample analysis device of FIG. 1.

The display screen (login name) DB 19 stores a display screen for accepting a login name and password. FIG. 6 shows one example of a display screen for accepting a password.

The operator information DB 20, as shown in FIG. 3, organizes and stores information concerning login name, password and language to be used for each operator. Information concerning the languages to be used may be expressed with symbols, or may be expressed with the database name of the display character DB (21, 22, 25, 26, 27, 28).

The login name and password are pieces of information required for verifying that the operator is authorized to use the sample analysis device, and are arbitrarily set by the respective operator. For information concerning the language to be used, the native language of the operator should be set.

When it is not required to set a login name and password for each operator, as shown in FIG. 4, the language name such as JAPANESE and ENGLISH may be used as a login name and password. JAPANESE, the language to be used, is set to correspond to the login name "JAPANESE", and ENGLISH, the language to be used, is set to the login name "ENGLISH". When the operator is Japanese, "JAPANESE" is inputted as a login name and password, and when the operator is American, "ENGLISH" is inputted. In addition, country name such as JAPAN, AMERICA, etc., may be used as a login name and password instead of a language name.

Figure 15:
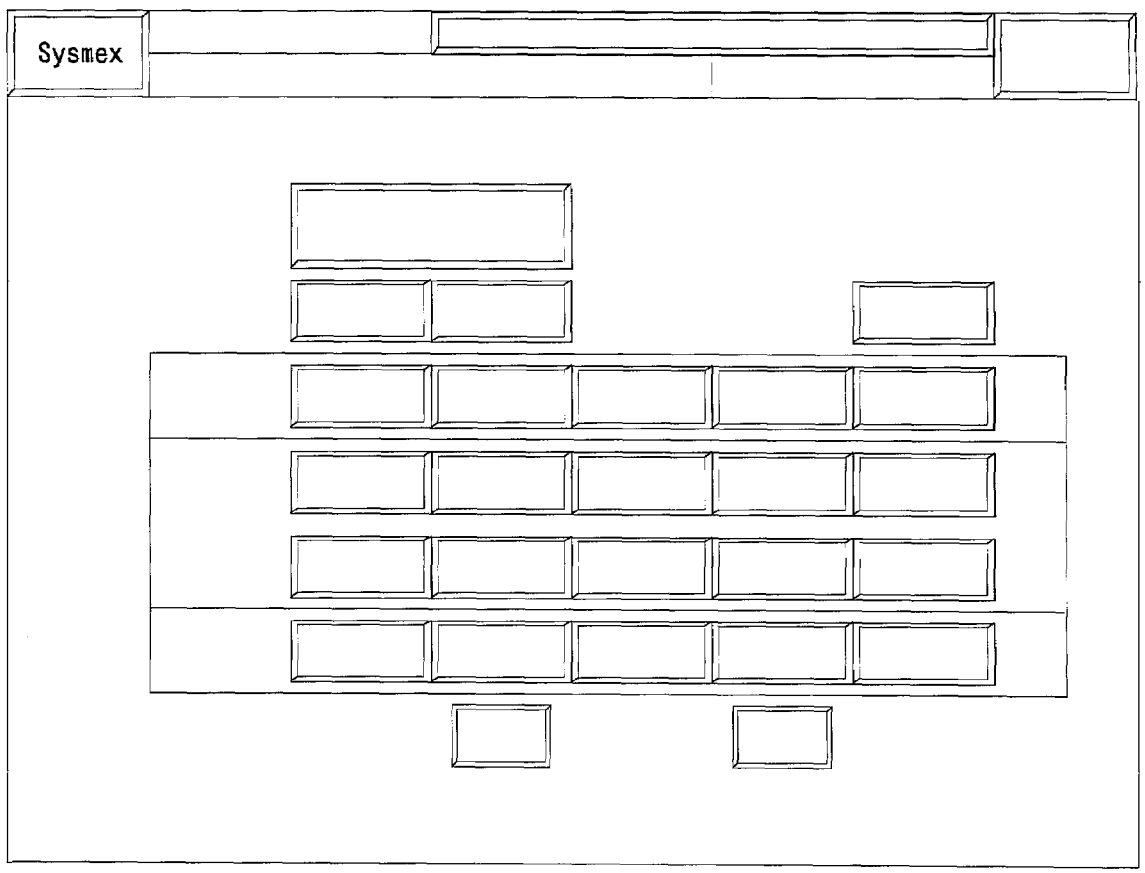
FIG. 15 is an explanatory diagram showing information stored in the sample analysis device of FIG. 1.
Figure 16:
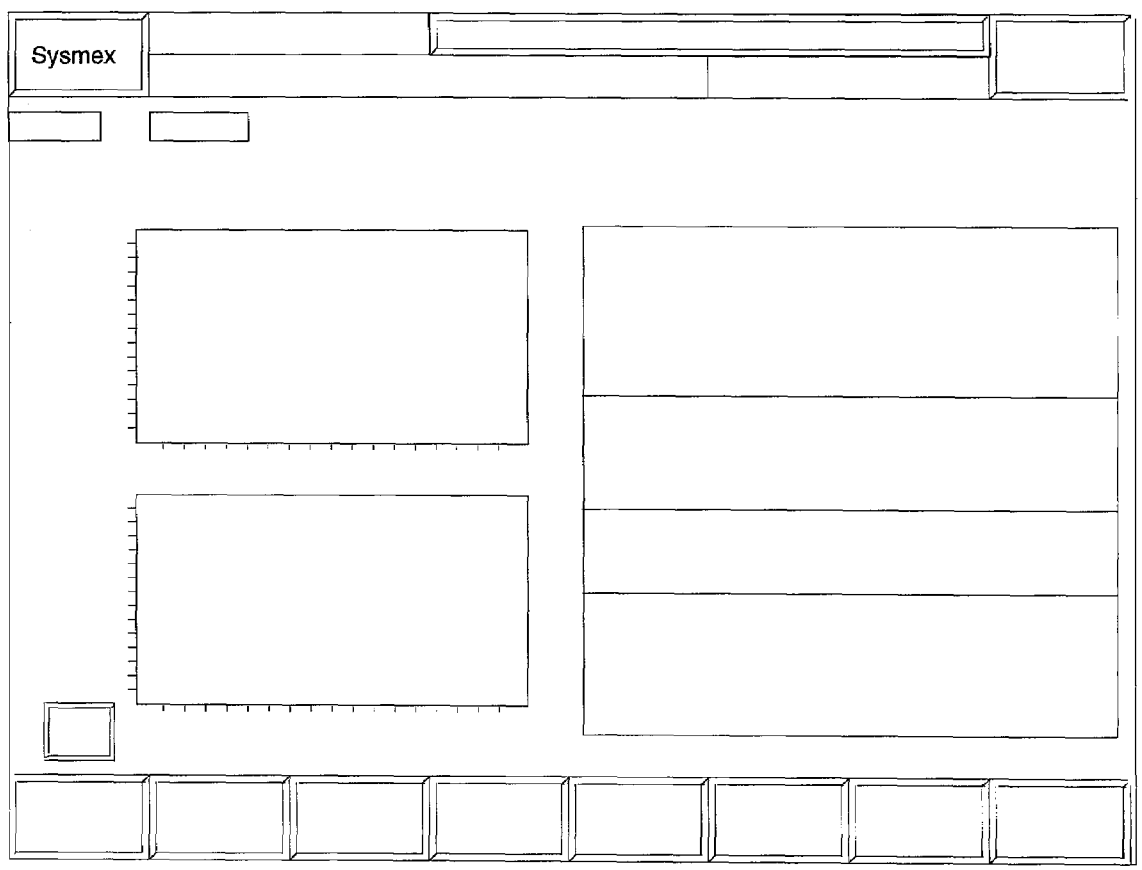
FIG. 16 is an explanatory diagram showing information stored in the sample analysis device of FIG. 1.

The display character (Japanese) DB 22 stores characters, which are described in Japanese, for combining with common patterns such as a pattern of measurement mode accepting screen (FIG. 14), a pattern of specimen information accepting screen (FIG. 15) and a pattern of measurement result screen (FIG. 16).

The display character (English) DB 23 stores characters, which are described in English, for combining with common patterns such as the pattern of measurement mode accepting screen (FIG. 14), the pattern of specimen information accepting screen (FIG. 15) and pattern of measurement result screen (FIG. 16).

The display character (French) DB 25, the display character (German) DB 26, the display character (Chinese) DB 27 and the display character (Russian) DB 28 also store characters for the same role as those of the above, the characters being described in respective languages.

The specimen information DB 23 stores information such as the specimen number and type of specimen which the specimen information acceptor 12 accepted from the operator.

The measurement result DB 24 stores measurement results calculated in the measurement result calculator 13.

The display character selection DB 29, as shown in FIG. 13, relates information concerning the language to be used to the used display character DB (21, 22, 25, 26, 27, 28) and stores them. If the database names of the display character DB (21, 22, 25, 26, 27, 28) are stored as information concerning the language to be used in the operator information DB 20, the display character selection DB 29 can be omitted.

Figure 14:
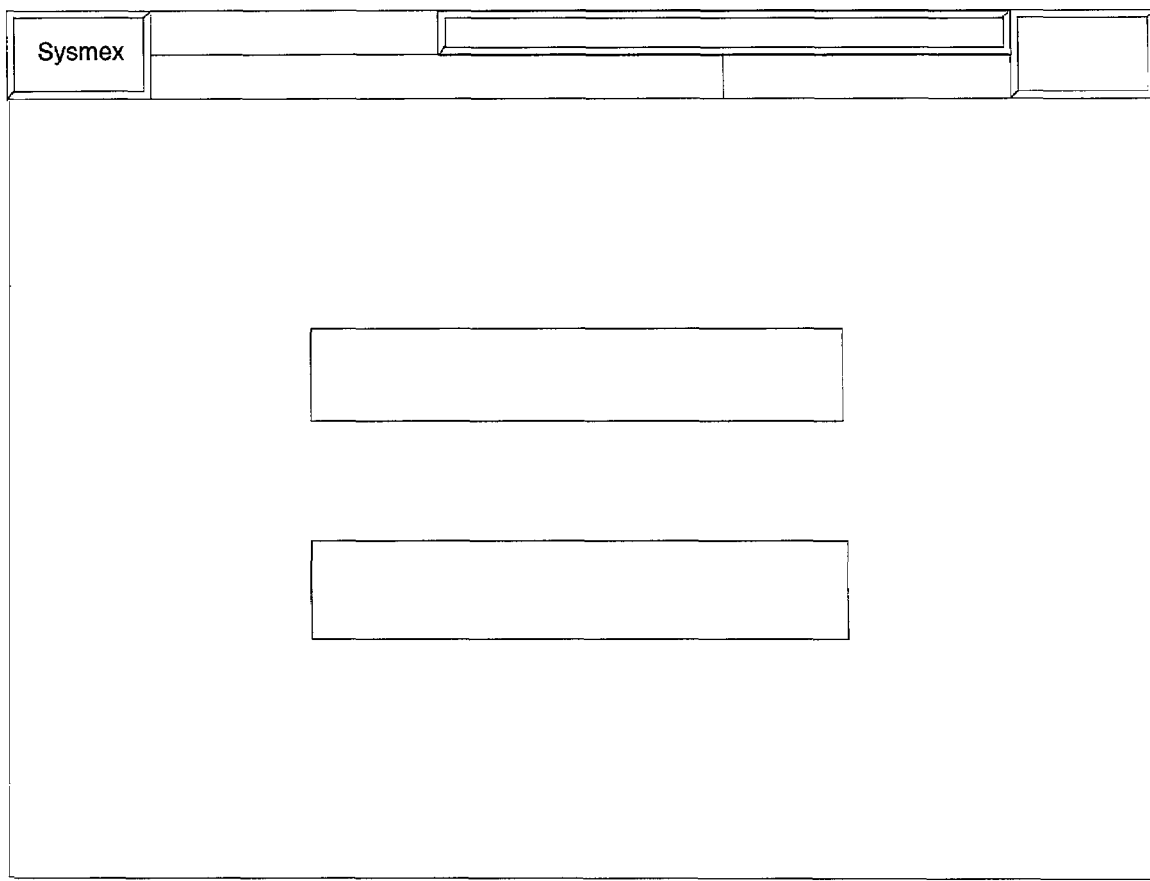
FIG. 14 is an explanatory diagram showing information stored in the sample analysis device of FIG. 1.

The common pattern DB 32 stores the pattern commonly used for all languages such as the pattern of measurement mode accepting screen shown in FIG. 14, the pattern of specimen information accepting screen shown in FIG. 15 and the pattern of measurement result screen shown in FIG. 16. As patterns, the external frame as shown in FIG. 14 through FIG. 16, and various items such as background color and design can be stored. Furthermore, it is possible to include pre-set characters in the pattern.

Figure 5:
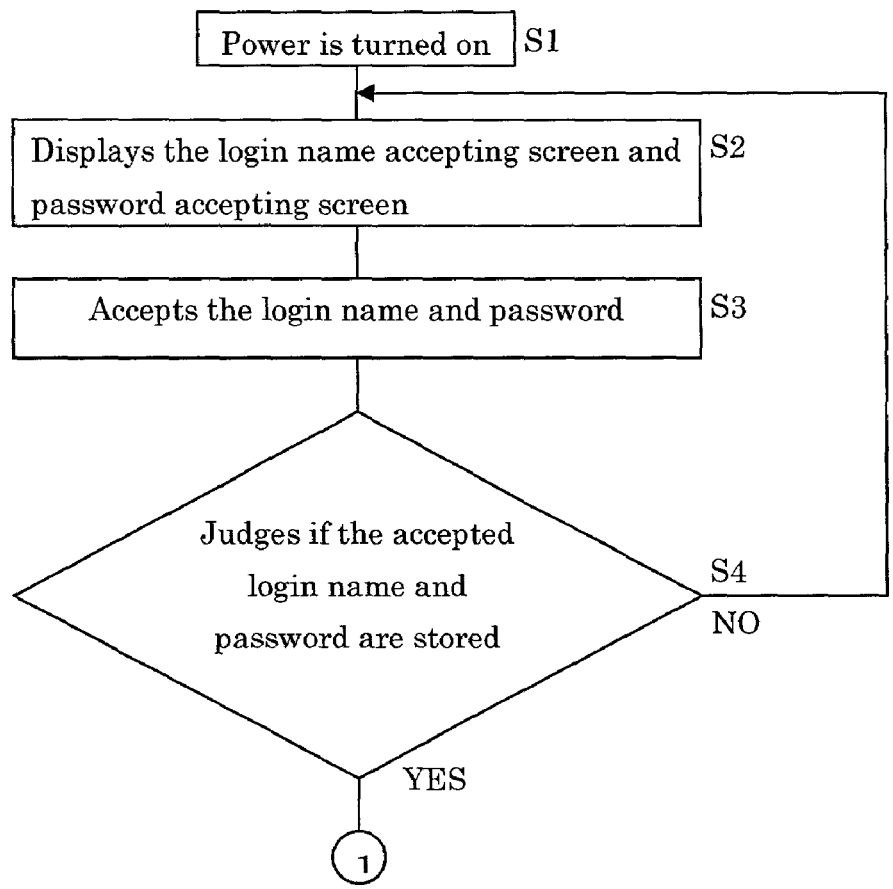
FIGS. 5a, 5b are flowcharts showing operation of the sample analysis system of FIG. 1.
Figure 5B:
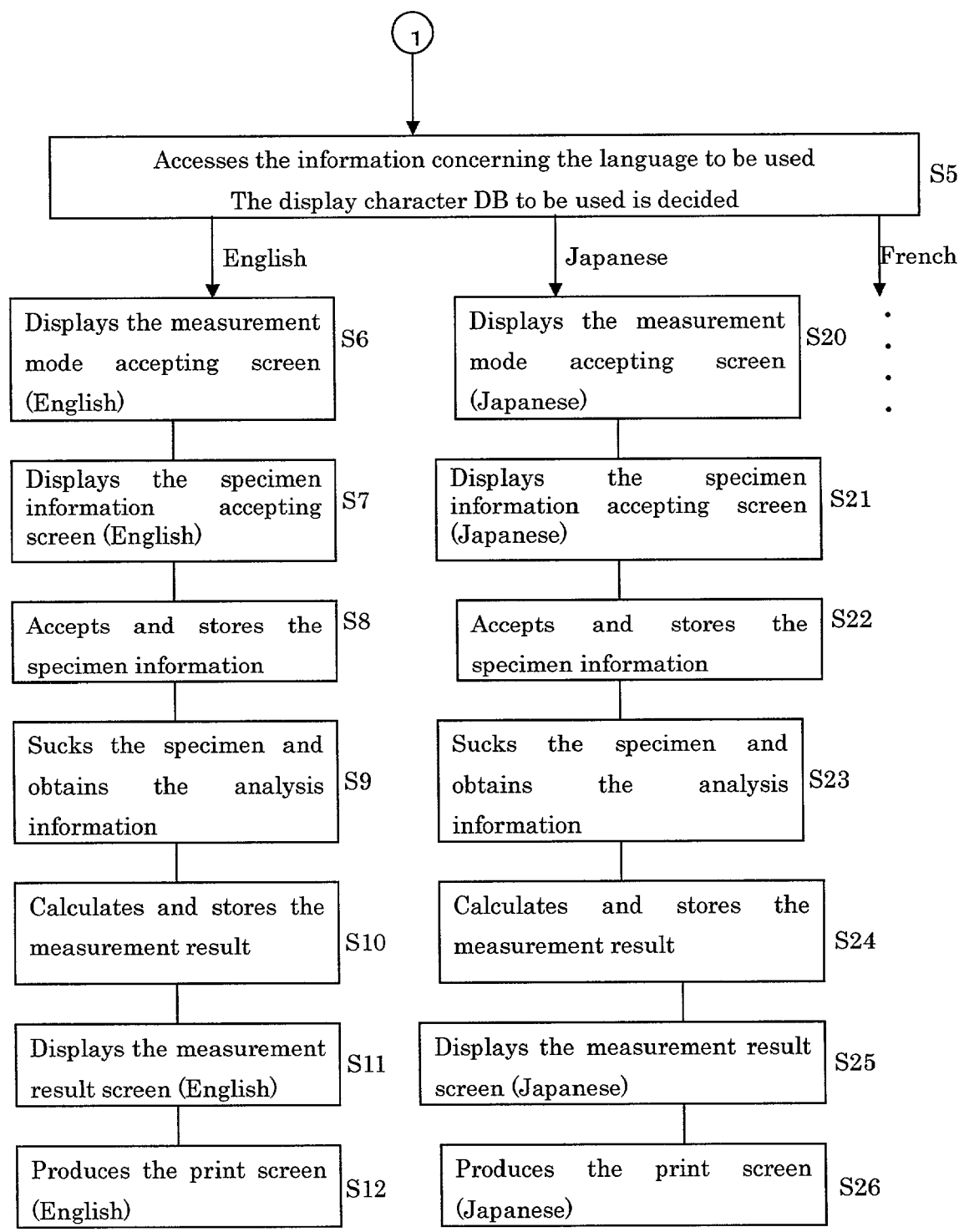

Next, as an example, the operation of the sample analysis system 1 from the time the operator turns on the power, until the time a measurement result is displayed, will be explained with reference to the flowchart shown in FIGS. 5A–5B and the display screens shown in FIG. 6 through FIG. 12.

1. Power for the sample analysis system 1 is turned on by an operator (S1).

2. The operator information acceptor 9 accesses the login name accepting screen and password accepting screen (FIG. 6) from the display screen (login name) DB 19, and displays them on the display panel 40.

3. The operator information acceptor 9 accepts the login name and password from the operator on the login name accepting screen and the password accepting screen (S2, S3).

Further, the login name and password may be also accepted by reading an operator identifying medium such as a barcode or an IC chip. 4. The operator information acceptor 9 judges if the accepted login name and password are stored in the operator information DB 20 (FIG. 3 or FIG. 4). If they are not stored, the login name accepting screen is displayed again (S4).

5. If the accepted login name and password are stored in the operator information DB 20, the display character selector 10 accesses the information concerning the language to be used stored that corresponds to the login name and password from the operator information DB 20. Next, the display character DB (21, 22, 25, 26, 27, 28) to be used is decided (S5) by the display character selection DB 29 (the content of this DB is shown in FIG. 13).

Now a case where information concerning the displayed language is described in English will be explained.

1. The measurement mode selector 11 and display screen producer 14 accesses a pattern of the measurement mode accepting screen shown in FIG. 14 from the common pattern DB 32, and accesses characters (English) from the display character (English) DB22, and produces a measurement mode accepting screen (FIG. 7) by combining the accessed pattern and characters, and then displays this on the display panel 40 (S6). As used herein, "manual mode" means a mode for suctioning specimen one by one from the suctioning pipette, and "sampler mode" means a mode for automatically carrying out agitation of the specimen, suction and measurement. Two instruction buttons are displayed on the measurement mode accepting screen, and are constituted so as to shift to manual or the sampler mode if the operator selects these buttons.

2. For example, when the manual mode is selected by the operator, the specimen information acceptor 12 and display screen producer 14 accesses a pattern of the specimen information accepting screen shown in FIG. 15 from the common pattern DB 32, and accesses characters (English) from the display character (English) DB 22, and produces a specimen information accepting screen (FIG. 8) by combining the readout pattern and characters, and then displays this on the display panel 40 (S7).

3. When the operator inputs the specimen information such as specimen number, gender of the subject, the urine collecting time, type of urine, color of urine and turbidity of urine through the specimen information accepting screen, the specimen information acceptor 12 stores those pieces of information into the specimen information DB 23 (S8).

4. The specimen analysis mechanism 30 sucks the specimen from the pipette, dilutes and dyes the specimen, obtains the analysis information such as the fluorescence amount and scattered light amount by the flow cytometer. The sample analysis mechanism 30 then digitally converts and provides the analysis information to the measurement result calculating part 13 (S9).

5. The measurement result calculating part 13 calculates the measurement result from the analysis information provided by the specimen analysis mechanism 30 and the specimen information stored in the specimen information DB 23, and then stores it in the measurement result DB 24 (S10).

6. The display screen producer 14 accesses a pattern of the measurement result screen shown in FIG. 16 from the common pattern DB 32, and accesses characters (English) from the display character (English) DB 22, the measurement result from the measurement result DB 24, and produces a measurement result screen (FIG. 9) by combining the readout pattern, characters and measurement result. The measurement result screen is then displayed on the display panel 40 (S11).

7. When printing of the measurement result screen is required, the print screen producer 15 produces a printing screen by combining the pattern of the measurement result screen stored in the common pattern DB 32, the characters (English) stored in the display character (English) DB 22 and the measurement results stored in the measurement result DB 24 (S12).

Now, a case where the information concerning the accessed language in the S5 is described in Japanese will be explained.

1. The measurement mode selector 11 and display screen producer 14 accesses a pattern of the measurement mode accepting screen shown in FIG. 14 from the common pattern DB 32, and accesses characters (Japanese) from the display character (Japanese) DB 21, and produces a measurement mode accepting screen (FIG. 10) by combining the accessed pattern and characters. The measurement mode accepting screen is then displayed on the display panel 40 (S20).

2. For example, when the manual mode is selected by the operator, the specimen information acceptor 12 and display screen producer 14 accesses a pattern of the specimen information accepting screen shown in FIG. 15 from the common pattern DB32, and accesses characters (Japanese) from the display character (Japanese) DB21, and produces a specimen information accepting screen (FIG. 11) by combining the readout pattern and characters. The specimen information accepting screen is then displayed on the display panel 40(S21).

3. When the operator inputs the specimen information such as specimen number, gender of the subject, the urine collecting time, type of urine, color of urine and turbidity of urine through the specimen information accepting screen, the specimen information acceptor 12 stores those pieces of information into the specimen information DB 23 (S22).

4. The specimen analysis mechanism 30 sucks the specimen from the pipette, dilutes and dyes the specimen, obtains the analysis information such as the fluorescence amount and scattered light amount by the flow cytometer, digitally converts and then provides the analysis information to the measurement result calculator 13 (S23).

5. The measurement result calculator 13 calculates the measurement result from the analysis information provided by the specimen analysis mechanism 30 and the specimen information stored in the specimen information DB 23, and then stores it in the measurement result DB 24 (S24).

6. The display screen producer 14 accesses a pattern of the measurement result screen shown in FIG. 16 from the common pattern DB 32, characters (Japanese) from the display character (Japanese) DB 21, and the measurement result from the measurement result DB 24, and produces a measurement result screen (FIG. 12) by combining the readout pattern, characters and measurement result. The measurement result screen is then displayed on the display panel 40 (S25).

7. When printing of the measurement result screen is required, the print screen producer 15 produces a printing screen by combining the pattern of the measurement result screen stored in the common pattern DB 32, the characters (Japanese) stored in the display character (Japanese) DB 21 and the measurement results stored in the measurement result DB 24 (S26).

When the information concerning the language accessed in S5 is French, German or the like, the operation can also be realized in the same way as those in English and Japanese by using the display character (French) DB 25 and the display character (German) DB 26 and so on.

Furthermore, measurement result units are sometimes expressed differently from country to country. For example, the measurement result of hemoglobin is generally expressed in g/dL in Japan, on the other hand, it is frequently expressed in g/L in English-speaking countries. In order to accommodate this, the characters expressing the unit among characters stored in the display character DB (21, 22, 25, 26, 27, 28) may be set for every display character DB (21, 22, 25, 26, 27, 28). In this case, the measurement result calculating method in the measurement result calculator 13 is changed depending on the selected display character DB (21, 22, 25, 26, 27, 28).

The above sample analysis system allows the language the operator requests to automatically be displayed without operation of language switching by the operator.

The above embodiments show devices for visually displaying information on the display panel 40 as a user interface and inputting commands by touching thereon, however, this invention is not limited to these embodiments. For example, the invention may also be used for a user interface in which commands are inputted by information display via voice and voice recognition. In a user interface based on voice type, the display character DB (21, 22, 25, 26, 27, 28) includes a voice recognition unit for each language, an audio storer for each language in which audio signals representative of a respective language are stored, an audio storer selector, and a voice generating unit. Furthermore, this invention can also be applied to a user interface equipped with both visual display and a voice generator.

The embodiments described above are only examples of devices and systems to which this invention may be applied. However, this invention is not limited to these devices and systems, rather, it is applicable to other machinery or equipment having a function for operating in a plurality of languages. For example, this invention is applicable to an operation panel of a machine tool, printer, copier, personal computer and ATM or the like. It is therefore intended to include within the invention all such variations and modifications as fall within the scope of the appended claims and equivalents thereof.

What is claimed is:

1. A sample analysis device which allows display of a plurality of languages, comprising:
    a sample analysis mechanism;
    an operator information storer adapted to organize operator information and information concerning a type of language which the operator uses, and to store the information;
    a first display character storer adapted to store characters of a first language;
    a second display character storer adapted to store characters of a second language;
    an input device adapted to accept input of the operator information;
    a display character selector for accessing information concerning the type of language corresponding to the operator information accepted by the input device from the operator information storer, and adapted to select which of the first and the second display character storer is to be used; and
    a display adapted to display the characters.

2. The sample analysis device according to claim 1, further comprising;
    a common pattern storer adapted to store a pattern for displaying in combination with the characters, and a display screen producer adapted to produce a display screen in combination with the characters and the pattern.

3. The sample analysis device according to claim 1, wherein a pattern comprising characters is stored in the first and the second display character storers.

4. The sample analysis device according to claim 1, wherein the operator information comprises information selected from the group consisting of a login name, a password, and a combination thereof.

5. The sample analysis device according to claim 1, wherein the operator information comprises a word expressing information selected from the group consisting of the type of language, a country name, and a combination thereof.

6. The sample analysis device according to claim 1, wherein the operator information comprises a login name and a password.

7. The sample analysis device according to claim 6, wherein one or both of the login name and the password comprises a word expressing information selected from the group consisting of the type of language, a country name, and a combination thereof.

8. The sample analysis device according to claim 1, wherein the input device is adapted to input of the operator information being accessed from a medium selected from the group consisting of a barcode, an IC chip, and a combination thereof.

9. The sample analysis device according to claim 1, wherein the first and the second languages are independently selected from the group consisting of Japanese, English, French, German, Chinese, Russian, and Spanish.

10. The sample analysis device according to claim 1, further comprising:
a printing screen producer adapted to convert the characters to a format for printing.

11. The sample analysis device according to claim 1, wherein a measurement result obtained by analyzing a sample is displayed by the display in combination with the characters.

12. The sample analysis device according to claim 1, wherein the sample comprises urine or blood.

13. A sample analysis device which allows display with a plurality of units, comprising:
an operator information storer adapted to organize and store at least two items of information independently selected from the group consisting of operator information, information concerning a type of language which the operator uses, and a resident country of the operator;
a first display unit storer in which units of a measurement result are described in a first unit;
a second display unit storer in which units of the measurement result are described in a second unit;
an input device for accepting input of the operator information;
a display unit selector for accessing information concerning the type of language or the resident country corresponding to the operator information accepted by the input device from the operator information storer, and selecting the display unit storer to be used;
an analyzer for obtaining analysis information by analyzing a sample, a measurement result calculator adapted to calculate the measurement result from the analysis information obtained by the analyzer depending on the information concerning the type of language or the resident country corresponding to the operator information accepted by the input device;
a display screen producer for producing a display screen in combination with the measurement result and the unit;
and a display for displaying the display screen.

14. The sample analysis device according to claim 13, further comprising:
a first display character storer in which characters are described in a first language; and
a second display character storer in which characters are described in a second language; wherein the display screen producer produces the display screen in combination with the measurement result, the selected unit, and the characters of the first or the second language.

15. The sample analysis device according to claim 13, wherein a pattern comprising the unit is stored in the display unit storer.

16. The sample analysis device according to claim 13, wherein the operator information comprises information selected from the group consisting of a login name, password, and a combination thereof.

17. The sample analysis device according to claim 16, wherein the operator information further comprises a word expressing information selected from the group consisting of the type of language, the resident country, and a combination thereof.

18. The sample analysis device according to claim 13, wherein the operator information comprises a login name and a password.

19. The sample analysis device according to claim 18, wherein one or both of the login name and the password comprises a word expressing information selected from the group consisting of the type of language, the resident country, and a combination thereof.

20. The sample analysis device according to claim 13, wherein the operator information is accessed from a barcode or an IC chip.

21. The sample analysis device according to claim 14, wherein the first language and the second language are independently selected from the group consisting of Japanese, English, French, German, Chinese, Russian, and Spanish.

22. The sample analysis device according to claim 13, further comprising a printing screen producer adapted to convert the units to a format for printing.

23. The sample analysis device according to claim 13, wherein the sample comprises urine or blood.

24. A displaying method comprising:
receiving operator information;
selecting a language based on the received operator information by using an operator information storer for storing the operator information and information concerning a type of language that the operator uses; and
displaying a character in the selected language;
wherein the displaying method is used in a sample analysis device.

25. A multi-language user interface comprising:
a display device for providing an operator with information;
an identification information storer for storing language information related to operator identification information and identification information of respective operators;
an input device for inputting the identification information of the operator;
a selector for accessing the identification information storer in response to input of the identification information from the input device and selecting a language related to the input identification information; and
a controller adapted to control the display device so as to be a user interface of the selected language;
wherein the multi-language user interface is configured for use in a sample analysis device.

26. The multi-language user interface according to claim 25, wherein the controller stores a plurality of patterns corresponding to a plurality of languages, and displays the patterns corresponding to the selected languages on the display device.

27. The multi-language user interface according to claim 25, wherein the controller stores a plurality of fonts corresponding to a plurality of languages, and displays the fonts corresponding to the selected languages on the display device.

28. A multi-language user interface, comprising:
an operator information storer for organizing and storing operator information and information concerning a type of language which the operator uses;
a first audio storer in which audio signals representative of a voice in a first language are stored;
a second audio storer in which audio signals representative of a voice in a second language are stored;

an input device adapted to accept input of the operator information;

a voice selector for accessing information concerning the type of language corresponding to the operator information accepted by the input device from the operator information storer, and for selecting the audio storer to be used; and a voice generator adapted to generate an audio signal from the selected audio storer;

wherein the multi-language user interface is configured for use in a sample analysis device.

* * * * *